United States Patent
McClure et al.

(10) Patent No.: US 6,656,411 B1
(45) Date of Patent: *Dec. 2, 2003

(54) GROOVED CORE PATTERN FOR OPTIMUM RESIN DISTRIBUTION

(75) Inventors: Edward Norman McClure, Torrance, CA (US); Steven Alan Jackson, Paramount, CA (US); Philip J. Sweesy, Carson, CA (US)

(73) Assignee: Northrop Grumman Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 37 days.

(21) Appl. No.: 09/228,433

(22) Filed: Jan. 11, 1999

(51) Int. Cl.[7] ............................................... B29C 70/44
(52) U.S. Cl. ..................... 264/510; 264/257; 264/258; 264/511; 264/571
(58) Field of Search ................................ 264/510, 511, 264/571, 257, 258

(56) References Cited

U.S. PATENT DOCUMENTS

| | | | |
|---|---|---|---|
| 2,913,036 A | 11/1959 | Smith | 154/1.6 |
| 3,146,148 A | 8/1964 | Mitchella et al. | 156/382 |
| 4,132,755 A | 1/1979 | Johnson | 264/553 |
| 4,280,804 A | 7/1981 | Holland | 425/388 |
| 4,359,437 A | 11/1982 | Le Comte | 264/102 |
| 4,560,523 A | 12/1985 | Plumley et al. | 264/102 |
| 4,676,041 A | 6/1987 | Ford | 52/309.11 |
| 4,780,262 A | 10/1988 | Von Volkli | 264/512 |
| 4,824,017 A | 4/1989 | Mansfield | 239/9 |
| 4,854,504 A | 8/1989 | Hedger, Jr. et al. | 239/294 |
| 4,902,215 A | 2/1990 | Seemann, III | 425/406 |
| 4,942,013 A | 7/1990 | Palmer et al. | 264/511 |
| 5,000,990 A | 3/1991 | Freeman | 428/36.1 |
| 5,009,821 A | 4/1991 | Weaver | 265/22 |
| 5,035,602 A | 7/1991 | Johnson | 425/468 |
| 5,041,260 A | 8/1991 | Johnson et al. | 264/510 |
| 5,045,251 A | 9/1991 | Johnson | 264/40.1 |
| 5,052,906 A | 10/1991 | Seemann | 425/112 |
| 5,096,651 A | 3/1992 | Le Comte | 264/510 |
| 5,132,069 A | 7/1992 | Newton | 264/257 |

(List continued on next page.)

OTHER PUBLICATIONS

Abstract: E. Mcclure Notes: *Recirculation Molding* Feb. 24, 1998.
Article: Scott M. Lewit and John C. Jakabowski, Structural Composites, Inc. and Navy CECMT Marine Composites Technology Center *Recireulation Molding–Recent Advances in Applications and Equipment* pp. 1–22.
Article: Gerry Kobe *Chrysler Molds The Future* Manufacturing pp. 58–60 Nov. 1997.

*Primary Examiner*—Stefan Staicovici
(74) *Attorney, Agent, or Firm*—Stetina Brunda Garred & Brucker

(57) ABSTRACT

In accordance with the present invention, there is provided a process for optimizing resin distribution during VARTM fabrication of a fiber-reinforced resin structure having a core body having a core upper surface extending between first and second edges, and at least one ply disposed upon the core upper surface. Longitudinal resin distribution grooves acre formed along the core upper surface substantially parallel to the longitudinal resin flow axis. Lateral resin distribution grooves are formed along the core upper surface. A vacuum is drawn between the resin infusion and the vacuum application ports. Resin is dispensed at the resin infusion port. The longitudinal and lateral resin distribution grooves are formed to wet the fiber-reinforced ply at substantially equal ply resin wetting rates in directions along the longitudinal resin flow axis and perpendicular thereto.

11 Claims, 2 Drawing Sheets

U.S. PATENT DOCUMENTS

| | | | |
|---|---|---|---|
| 5,169,571 A | 12/1992 | Buckley | 264/22 |
| 5,183,619 A | 2/1993 | Tolton | 264/257 |
| 5,215,322 A | 6/1993 | Enders | 280/231 |
| 5,266,139 A | 11/1993 | Yokota et al. | 156/169 |
| 5,275,372 A | 1/1994 | Boeckeler | 249/134 |
| 5,281,388 A | 1/1994 | Palmer et al. | 264/571 |
| 5,298,212 A | 3/1994 | Stecker | 264/571 |
| 5,316,462 A | 5/1994 | Seemann | 425/112 |
| 5,322,665 A | 6/1994 | Bernardon et al. | 264/571 |
| 5,388,768 A | 2/1995 | Moses | 239/417 |
| 5,403,537 A | 4/1995 | Seal et al. | 264/511 |
| 5,407,610 A | 4/1995 | Kohama et al. | 264/22 |
| 5,432,010 A | 7/1995 | Ko et al. | 428/542.8 |
| 5,439,635 A | 8/1995 | Seemann | 264/510 |
| 5,480,603 A | 1/1996 | Lopez et al. | 264/131 |
| 5,484,277 A | 1/1996 | Lindsay | 425/388 |
| 5,500,164 A | 3/1996 | Livesay et al. | 264/459 |
| 5,516,271 A | 5/1996 | Swenor et al. | 425/127 |
| 5,540,497 A | 7/1996 | Addeo et al. | 366/159.1 |
| 5,549,246 A | 8/1996 | Kukesh | 239/9 |
| 5,576,030 A | 11/1996 | Hooper | 425/112 |
| 5,588,392 A | 12/1996 | Bailey | 114/357 |
| 5,639,027 A | 6/1997 | Fritz | 239/414 |
| 5,641,525 A | 6/1997 | Yakel | 425/390 |
| 5,665,301 A | 9/1997 | Alanko | 264/571 |
| 5,678,591 A | 10/1997 | Merrifield et al. | 137/208 |
| 5,702,663 A | 12/1997 | Seemann | 264/510 |
| 5,721,034 A | 2/1998 | Seemann, III et al. | 428/71 |
| 5,733,494 A | 3/1998 | Moore | 264/258 |
| 5,741,450 A | 4/1998 | Monroe | 264/102 |
| 5,885,513 A * | 3/1999 | Louderback et al. | 264/459 |

* cited by examiner

GROOVED CORE PATTERN FOR OPTIMUM RESIN DISTRIBUTION

FIELD OF THE INVENTION

The present invention relates generally to fiber-reinforced resin structures, and more particularly to a process for optimizing resin distribution with the incorporation of a grooved core integral to the fiber-reinforced resin structure.

BACKGROUND OF THE INVENTION

Vacuum assisted resin transfer molding (VARTM) and related processes and techniques have been widely used to fabricate relatively large fiber-reinforced composite articles. Such articles may include coach chassis for buses and trailers and fiber glass boat hulls, for example.

In general, the VARTM process includes the distribution of dry, fiber strips, plies or mats about the surface of a female mold to form a fiber lay-up of a desired thickness. The fiber strips or plies may take the form of a cloth or sheet of fibers of glass, carbon or other suitable material. In addition, one or more rigid core layers may be included. The core layers may be formed of a solid foam material or balsa wood. The core layers may be sandwiched between the fiber plies to form a fiber/core composite lay-up or laminate.

A flexible, fluid impermeable bag, sheet or covering is positioned atop the exposed lay-up and sealed about the periphery thereof. A relative vacuum is drawn between the mold and the bag, thereby causing the bag to compress against the fiber lay-up. A chemically catalyzed liquid resin is introduced into the evacuated bagged mold through a series of resin supply lines or conduits. A multitude of individual resin supply lines may be used so as to facilitate distributed wetting or infusion of the liquid resin about the fiber lay-up. The vacuum source and resin supply lines are strategically positioned relative to one another in a manner which encourages controlled wetting. In this respect, the vacuum source may be applied at one side of the fiber lay-up and the resin introduced at an opposing side, and thus tending to cause the resin to be pulled across and wet portions of the fiber lay-up therebetween.

Underwetting and overwetting of the fiber lay-up are particularly problematic, as such conditions may result unacceptable structural weaknesses and deficiencies of the resultant article. In addition, nonuniform resin distribution may also result unacceptable structural weaknesses and deficiencies of the resultant article.

Contemporary techniques for facilitating more uniformed or homogeneous resin distribution include the use of cloth material adjacent the fiber lay-up. The cloth forms a screen or matrix of open spaces which tends to wick the resin, and thereby facilitates resin flow. The cloth is removed or peeled away prior to the resin fully curing. Other techniques for enhancing more uniformed resin distribution focus on the resin delivery apparatus, such as specially formed resin supply conduit manifolds and manifolds which are integrated into the vacuum bag itself. While these and other techniques enhance the distribution of resin about the fiber lay-up, they each require the positioning and application of a particular type of cloth or conduit manifold or the like, each time the article is formed. In addition, specialized procedures for disposal and/or clean-up of such additional apparatus must be addressed as well. As such, use of such apparatus increases the time and skill requirements in order to fabricate a resultant article to desired quality control standards.

Where resin overwetting is detected prior to the resin curing, excess resin may be removed via skilled labor intensive steps. Where underwetting is detected in a cured lay-up, the structure may be required to undergo additional processing in the form of reinfusion of liquid resin and subsequent curing of the resin. While such labor intensive steps, including inspection tasks, may be result in a structure which conforms to desired mechanical requirements, such a process so limits the production efficiency so as to make the process economically nonfeasible.

As such, based upon the foregoing, there exists a need in the art for an improved method and device, for enhancing resin distribution in comparison to the prior art.

SUMMARY OF THE INVENTION

In accordance with the present invention, there is provided a process for optimizing resin distribution during VARTM fabrication of a fiber-reinforced resin structure having a core body having a core upper surface extending between first and second edges, and at least one ply disposed upon the core upper surface. A resin infusion port is formed along the first edge for dispensing resin thereat. A vacuum application port is formed along the second edge for drawing a vacuum thereat. Extending along the core upper surface between the first and second edges is a longitudinal resin flow axis. Longitudinal resin distribution grooves are formed along the core upper surface substantially parallel to the longitudinal resin flow axis. Lateral resin distribution grooves are formed along the core upper surface. The lateral resin distribution grooves are arrayed to intersect the longitudinal resin distribution grooves. At least one fiber-reinforced ply is applied upon the grooved core upper surface. A vacuum is drawn between the resin infusion and the vacuum application ports. Resin is dispensed at the resin infusion port. The longitudinal and lateral resin distribution grooves are formed to wet the fiber-reinforced ply at substantially equal ply resin wetting rates in directions along the longitudinal resin flow axis and perpendicular thereto.

Preferably, the longitudinal and lateral resin distribution grooves are cooperatively formed and spaced to migrate the resin to the second edge upon substantially wetting the fiber-reinforced ply between the longitudinal resin distribution grooves. In this respect, the lateral resin distribution grooves may have a spacing which is a function of resin viscosity and ply wetability.

The process of fabricating fiber-reinforced structures in accordance with the present invention presents numerous advantages not found in the related prior art. In this respect, the process is particularly adapted to provide enhanced resin distribution by the incorporation of the cooperatively formed longitudinal and lateral resin distribution grooves. Such enhanced resin distribution tends to increase the structural integrity of the resultant fiber-reinforced resin structures and reduce the time and skill fabrication requirements. This is because the longitudinal and lateral resin distribution grooves are sized and spaced for optimum resin distribution, i.e., the longitudinal and lateral ply wetting rate are substantially equal. As such, the resultant structures can be produced at rates which make the technology more economically viable.

As such, the present invention represents an advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
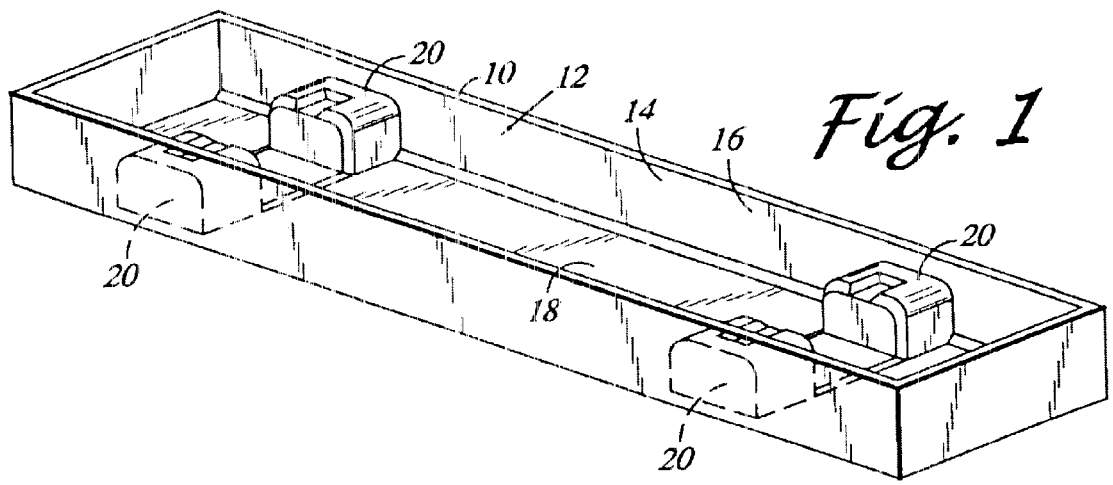
FIG. 1 is a perspective view of a mold for use in conjunction with the process of the present invention.

Referring now to the drawings wherein the showings are for purposes of illustrating a preferred embodiment of the present invention only, and not for purposes of limiting the same, FIGS. 1–4 illustrate a process for optimizing resin distribution during VARTM fabrication of a fiber-reinforced resin structure.

Referring now to FIG. 1, there is depicted a mold 10 which is used to fabricate fiber-reinforced resin structures. The mold 10 defines a mold cavity 12 and having a mold surface 14. The mold 10 is sized and configured to conform to the shape of desired resultant product. In this respect, the mold 10 is symbolically representative. The mold 10 is depicted to conform to the geometry of a bus lower chassis and is therefore provided with wall, floor and wheel well portions 16, 18, 20. As such, it is observed that the mold surface 14 has regions which are aligned to be horizontal, vertical and at other angular orientations. Further, it is contemplated that the mold surface 14 may have generally planar portions as well as those which or curved or irregularly shaped.

Figure 3:
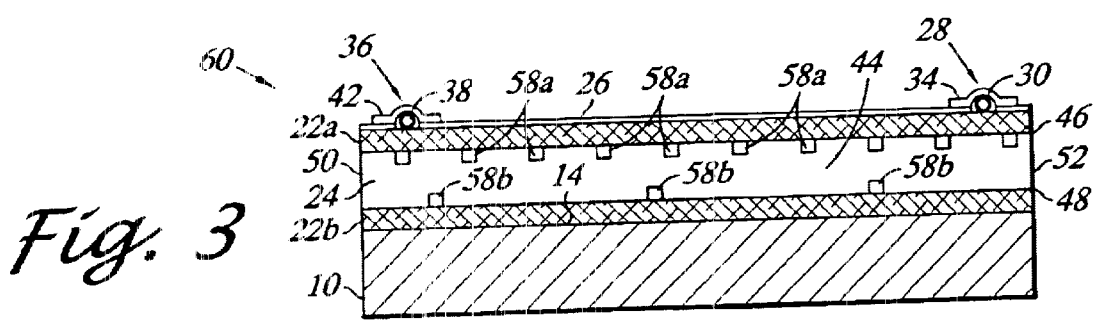
FIG. 3 is a cross-sectional side view of the grooved core as shown in functional relationship the fiber-reinforced plies and a bagged mold used in the process of the present invention.

The VARTM process of forming fiber-reinforced resin structures typically begins with the distribution of fiber-reinforced plies 22 about the mold surface 14 (as used herein the reference numeral 22 shall refer to either 22a or 22b as symbolically depicted in FIG. 3). The fiber-reinforced plies 22 take the form of a cloth or sheet of fibers of glass, carbon or other suitable materials which are well known to one of ordinary skill in the art. In addition, as further discussed below, one or more rigid core layers 24 may be included. The core layers 24 may be formed of a solid foam material, balsa wood or other suitable materials which are well known to one of ordinary skill in the art. The core layer 24 may be sandwiched between the fiber-reinforced plies 22 to form a fiber/core composite lay-up or laminate. The fiber-reinforced plies 22 and core layer 24 are applied to a desired thickness. Any number of fiber-reinforced plies 22 and core layers 24 may be included. It is contemplated that the mold 10 and mold surface 14 are of such structural integrity so as to be supportive the fiber-reinforced plies 22 and core layers 24.

The typical VARTM process further provides for a flexible, fluid impermeable bag or covering 26 is positioned atop the topmost fiber-reinforced ply 22. The periphery of the covering 26 is sealed against the mold surface 14 thereby bagging the fiber-reinforced plies 22 and core layer 24 therein. A relative vacuum is drawn between the mold 10 and the covering 26, thereby causing the covering 26 to compress and collapse against the fiber lay-up, according to those methods which are well known to one of ordinary skill in the art. In this respect, a vacuum application port 28 may be selectively distributed about the mold 10. The vacuum application port 28 may include a perforated vacuum line 30 which is in vacuum communication with a vacuum source 32. The vacuum application port 28 may be disposed through the covering 26 or at the periphery thereof and may be sealed thereat via a vacuum manifold 34. It is contemplated that other methods and apparatus may be employed to provide the desired vacuum draw and are chosen from those which are well known to one of ordinary skill in the art.

A chemically catalyzed liquid resin dispensed about the fiber-reinforced plies 22 and core layer 24. In this respect, a resin infusion port 36 may be selectively distributed about the mold 10. The resin infusion port 36 may include a perforated resin distribution line 38 which is in fluid communication with a resin source 40. The resin infusion port 36 may be disposed through the covering 26 or at the periphery thereof and may be sealed thereat via a resin distribution manifold 42. It is contemplated that other methods and apparatus may be employed to dispense the resin and are chosen from those which are well known to one of ordinary skill in the art. A multitude of individual resin infusion port 36 may be used so as to facilitate distributed wetting or infusion of the liquid resin about the fiber-reinforced plies 22. As depicted, as is typical in the art, the resin infusion port 36 may be topically mounted upon the topmost fiber-reinforced ply 22. It is contemplated, however, that the resin infusion port 36 may be integrated within the ply/core lay-up or at the periphery thereof according to those methods which are well known to one of ordinary skill in the art.

Figure 2:
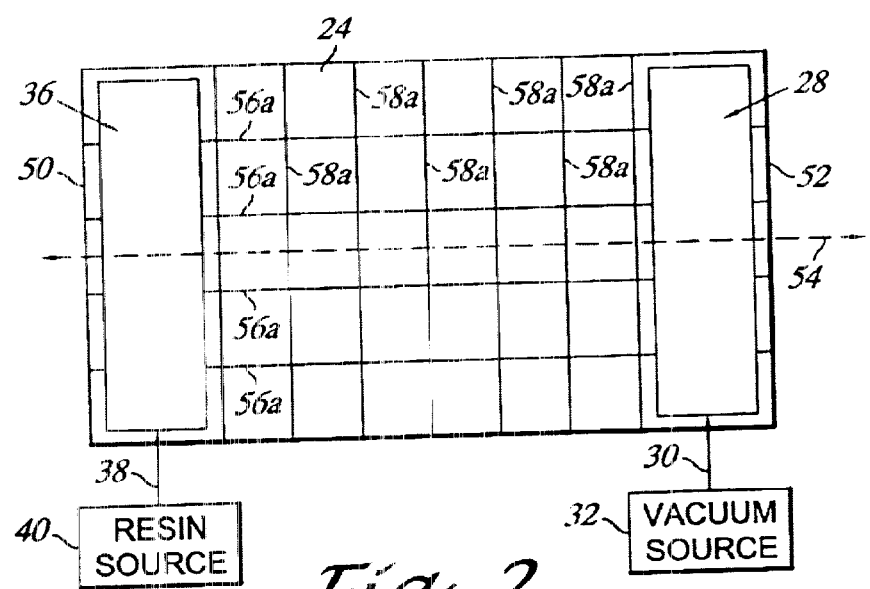
FIG. 2 is a top view of grooved core in functional relationship to resin and vacuum ports used in the process of the present invention.
Figure 4:
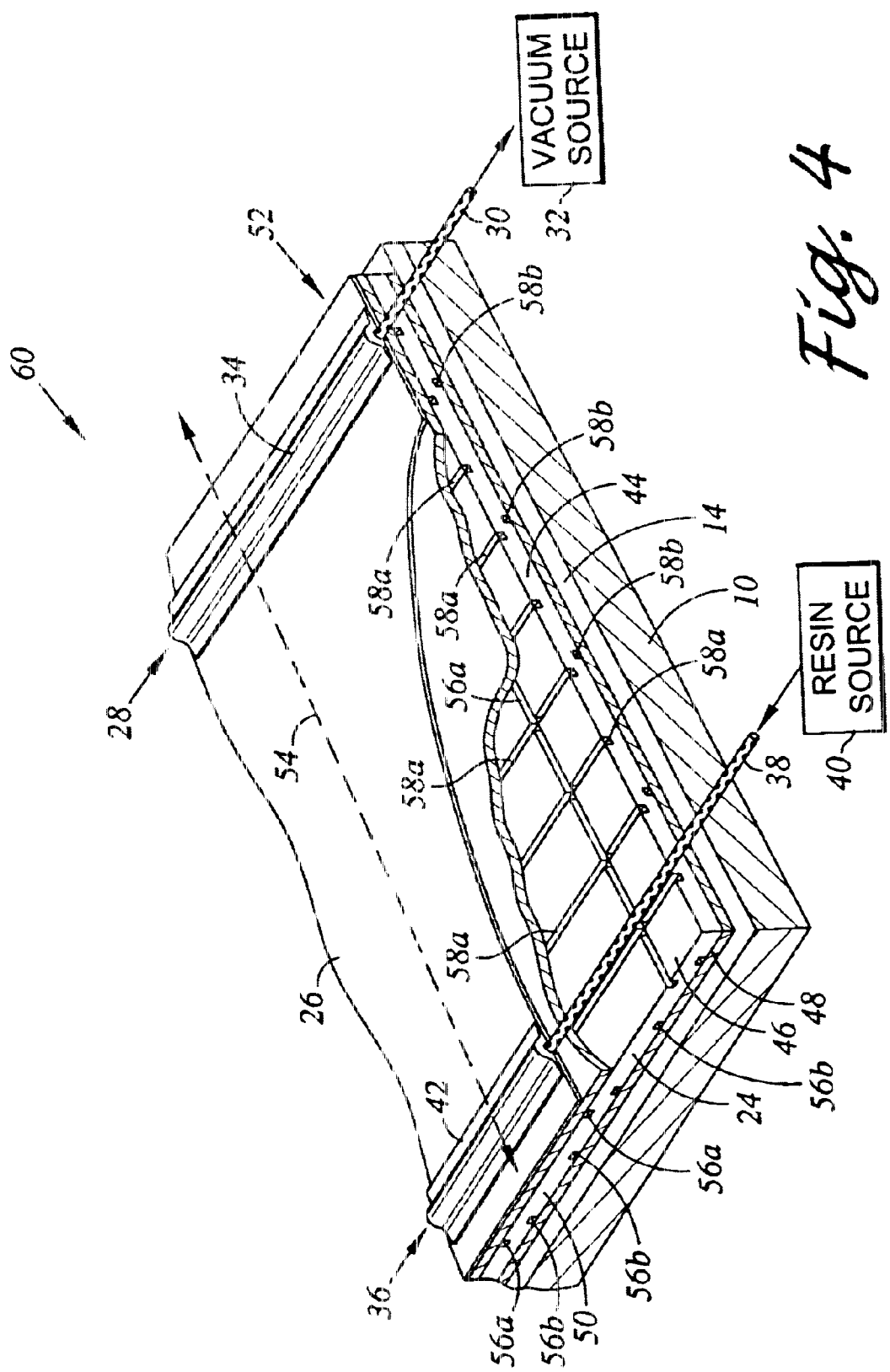
FIG. 4 is a perspective view of the grooved core as shown in functional relationship the fiber-reinforced plies and a bagged mold used in the process of the present invention.

Referring now to FIGS. 2–4, there is depicted the floor portion 18 of the mold 10 symbolically shown in FIG. 1. In this respect, while the floor portion 18 is planar, it is contemplated that the process of the present invention has application anywhere about the mold surface 14 which may include regions which are aligned to be horizontal, vertical and at other angular orientations and has generally planar portions as well as those which or curved or irregularly shaped.

As mentioned above, a core layer 24 may be incorporated with the fiber-reinforced plies 22. The core layer 24 is defined by core body 44 having opposing upper and lower surfaces 46, 48. The upper and lower surfaces 46, 48 extend between first and second edges 50, 52 of the core body 44. According to the method of the present invention, the resin infusion port 36 is formed along the first edge 50 for dispensing resin thereat. The vacuum application port 28 is formed along the second edge 52 for drawing a vacuum thereat. Extending along the core body 44 between the first and second edges 50, 52 is a longitudinal resin flow axis 54. In this respect, referring now to FIG. 2, there is depicted the core upper surface 46 shown in relation to the resin infusion and vacuum application ports 36, 28 (for ease of explanation, the fiber-reinforced ply 22a and fluid impermeably covering 26 are not depicted).

Importantly, longitudinal resin distribution grooves 56 are formed along the core upper and lower surfaces 46, 48 substantially parallel to the longitudinal resin flow axis 54. Lateral resin distribution grooves 58 along the core upper and lower surfaces. The lateral resin distribution grooves 58 are arrayed to intersect the longitudinal resin distribution grooves 56. In order to practice the present invention, however, it is contemplated that the longitudinal and lateral resin distribution grooves 56, 58 need only be formed upon a respective one of the core upper and lower surfaces 46, 48. As discussed more fully below, the longitudinal and lateral resin distribution grooves 56, 58 are particularly configured to optimize resin distribution about the adjacent fiber-reinforced reinforced plies 22. It is contemplated that the longitudinal and lateral resin distribution grooves 56, 58 may be integrally formed in the core body 44 during the manufacture thereof. Alternatively, the core body 44 may be machined to include the longitudinal and lateral resin distribution grooves 56, 58 therein.

As depicted, at least one fiber-reinforced ply 22b is applied upon the mold surface 14. The core layer 24 is distributed over the fiber-reinforced ply 22. The longitudinal and lateral resin distribution grooves 56b, 58b formed in the core lower surface 48 are exposed to the fiber-reinforced ply 22b. Another fiber-reinforced ply 22a is then distributed upon the grooved core upper surface 46 of the core layer 24. The longitudinal and lateral resin distribution grooves 56a, 58a are exposed to the fiber-reinforced ply 22a.

In practice, a vacuum is drawn between the resin infusion and vacuum application ports 36, 28. Resin is dispensed at the resin infusion port 36 adjacent the longitudinal resin distribution grooves 56. As such, the plies 22 tend to wick or are subject to wetting and infusion of the resin. According to the process of the present invention, the longitudinal and lateral resin distribution grooves 56, 58 are cooperatively formed to wet the adjacent fiber-reinforced plies 22 in a particular manner. In particular, the longitudinal and lateral resin distribution grooves 56, 58 are cooperatively formed to wet the adjacent fiber-reinforced plies 22 at substantially equal ply resin wetting rates in directions along the longitudinal resin flow axis 54 and perpendicular thereto. Thus, the longitudinal and lateral resin distribution grooves 56, 58 form a network which faciliates efficient ply wetting and is integrated into the resultant fiber-reinforced resin structure 60 itself.

It is contemplated that upon sufficient wetting or infusion of the adjacent plies 22, the pumping of the resin is ceased. The infused fiber-reinforced plies 22 and core layer 24 are allowed to cure according to those methods which are well known to one of ordinary skill in the art. After the plies 22 have cured, the resultant fiber-reinforced resin structure 60 is removed from the mold 10. It is contemplated that in order to facilitate ease of such removal, a gelcoat of suitable material known to those of ordinary skill in the art may be initially applied to the mold 10.

As mentioned above, the lateral resin distribution grooves 58 are spaced to wet the fiber-reinforced ply 22 at substantially equal ply resin wetting rates in directions along the longitudinal resin flow axis 54 and perpendicular thereto. As such, the longitudinal and lateral resin distribution grooves 56, 58 may be cooperatively formed to migrate the resin from the first edge 50 to the second edge 52 upon substantially wetting the fiber-reinforced ply 22 between the adjacent longitudinal resin distribution grooves 56, 58. For a given longitudinal resin distribution groove configuration, the lateral resin distribution grooves 58 may have a spacing which is a highly functionally dependent upon resin viscosity and ply wetability. Resin viscosity may be a function of not only the very nature of the resin itself, but also factors such as temperature and the catalyst used and time elapsed prior to curing. Ply wetability may be a function ply weave density, the length, diameter and nature of the fibers which comprise the plies 22, and ply thickness, for example. It is contemplated that for a given longitudinal resin distribution groove configuration, as the resin viscosity and ply wetability are increased, the spacing of the lateral resin distribution grooves 58 will generally be required to increase in order to maintain comparable ply resin wetting rates.

In the preferred embodiment of the present invention, the longitudinal resin distribution grooves 56 are formed to be substantially perpendicular to the lateral resin distribution grooves 58. In this respect, the longitudinal and lateral resin distribution grooves 56 are formed in a grid-like or criscrossed pattern. It is contemplated that the lateral resin distribution grooves 58 intersect the, longitudinal resin distribution grooves 56 at other angular orientations as well. Preferably, the longitudinal and lateral resin distribution grooves 56, 58 are uniformly spaced. For example, the longitudinal resin distribution grooves 56 may be spaced two inches apart. It is contemplated, however, that the longitudinal and lateral resin distribution grooves 56, 58 may not be uniformly spaced. Such non-uniformity may be a function of the localized mold geometry, mold surface angular orientation and particular placement and nature of the resin infusion and vacuum application ports 36, 28.

It is contemplated that the longitudinal resin distribution grooves 56 may have different spacing, cross-sectional shapes (e.g., rectangular or semi-circular) and cross-sectional sizing than the lateral resin distribution grooves 58. In addition, the spacing, cross-sectional shapes and cross-sectional sizing of respective ones of the longitudinal and/or lateral resin distribution grooves 56, 58 or portions thereof may be variable. In addition, where the longitudinal and lateral resin distribution grooves 56, 58 are formed about both the core upper and lower surfaces 46, 48, their respective spacing, cross-sectional shapes and cross-sectional sizing may vary with respect to those at each respective core upper or lower surface 46, 48. Such variations may be a function of the localized mold geometry, the mold surface angular orientation and the particular placement and nature of the resin infusion and vacuum application ports 36, 28.

Preferably, the longitudinal and lateral resin distribution grooves 56, 58 may be formed to have similar rectangular cross-sections which are an eighth of an inch deep and an eighth of an inch wide.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A process for optimizing resin distribution during VARTM fabrication of a fiber-reinforced resin structure having a core body having a core upper surface extending between first and second edges, and at least one ply disposed upon the core upper surface, the process comprising:

(a) forming a resin infusion port along the first edge for dispensing resin thereat;

(b) forming a vacuum application port along the second edge for drawing a vacuum thereat;

(c) defining a longitudinal resin flow axis extending along the core upper surface between the first and second edges;

(d) forming longitudinal resin distribution grooves along the core upper surface substantially parallel to the longitudinal resin flow axis;

(e) arraying lateral resin distribution grooves along the core upper surface by forming the lateral resin distribution grooves to intersect the longitudinal resin distribution grooves, the lateral resin distribution grooves are selectively spaced to wet the fiber-reinforced ply at substantially equal ply resin wetting rates in directions along the longitudinal resin flow axis and perpendicular thereto across the core upper surface upon the introduction of resin at the resin infusion;

(f) applying at least one fiber-reinforced ply upon the grooved core upper surface;

(g) drawing a vacuum between the resin infusion and the vacuum application ports; and (h) dispensing resin at the resin infusion port.

2. The process of claim 1 wherein the longitudinal and lateral resin distribution grooves are cooperatively formed to migrate the resin to the second edge.

3. The process of claim 1 wherein the lateral resin distribution grooves having a spacing which is a function of resin viscosity.

4. The process of claim 1 wherein the lateral resin distribution grooves having a spacing which is a function of ply wetability.

5. The process of claim 1 wherein the longitudinal resin distribution grooves are perpendicular to the lateral resin distribution grooves.

6. The process of claim 1 wherein the longitudinal and lateral resin distribution grooves are uniformly spaced.

7. The process of claim 1 wherein the longitudinal and lateral resin distribution grooves are formed to have similar cross-sectional areas.

8. The process of claim 1 wherein the longitudinal resin distribution grooves are spaced two inches apart.

9. The process of claim 1 wherein the longitudinal and lateral resin distribution grooves are formed to have rectangular cross-sections.

10. The process of claim 9 wherein the longitudinal and lateral resin distribution grooves are an eighth of an inch deep and an eighth of an inch wide.

11. The process of claim 1 wherein the core body further having a core lower surface extending between the first and second edges and at least one ply being disposed upon the core lower surface, wherein the process further comprising the steps of forming the longitudinal and lateral resin distribution grooves along the core lower surface.

* * * * *